United States Patent [19]

Isoi et al.

[11] Patent Number: 4,565,750

[45] Date of Patent: Jan. 21, 1986

[54] ELECTROLYTE CONTAINER FOR BATTERY AND METHOD OF FILLING ELECTROLYTE

[75] Inventors: Toshihiro Isoi, Takatsuki; Michio Yashima, Kawagoe; Shuuji Takahashi, Ooi, all of Japan

[73] Assignees: Honda Giken Kogyo Kabushiki Kaisha, Tokyo; Yuasa Battery Co., Ltd., Osaka, both of Japan

[21] Appl. No.: 656,373

[22] Filed: Oct. 1, 1984

[30] Foreign Application Priority Data

Sep. 30, 1983 [JP] Japan ................................ 58-184046
Oct. 10, 1983 [JP] Japan ........................... 58-156408[U]

[51] Int. Cl.[4] ................................................ H01M 2/36

[52] U.S. Cl. ......................................... 429/72; 429/80; 141/241

[58] Field of Search ....................... 429/72, 71, 73, 74, 429/79, 80, 75, 76, 63, 64, 163, 176; 141/237, 238, 241, 100; 222/107, 129

[56] References Cited

U.S. PATENT DOCUMENTS 1,354,800 10/1920 Butler .................................... 429/64
2,299,545 10/1942 Jardine .................................. 429/63
2,339,642 1/1944 LeGro et al. .......................... 429/63
2,471,094 5/1949 Christen ............................ 429/74 X
2,899,481 8/1959 Kardorff ........................... 429/72 X
3,103,452 9/1963 Comanor et al. ...................... 429/72

FOREIGN PATENT DOCUMENTS 0133763 10/1980 Japan .................................. 141/238
677592 8/1952 United Kingdom ................ 222/107

*Primary Examiner*—Anthony Skapars
*Attorney, Agent, or Firm*—Armstrong, Nikaido, Marmelstein & Kubovcik

[57] ABSTRACT

An electrolyte container for simultaneously filling electrolyte into the individual cells of a multi-cell dry-charged storage battery comprising a shell body having a plurality of spaced cell units, corresponding in number to the battery to be filled and each containing the quantity of electrolyte required to fill the corresponding battery cell, each container cell unit including a flow regulator, a sealed tip and a cutting line between the tip and flow regulator for cutting and removing the tip when the container is to be used to fill the cells of a dry-charged battery.

3 Claims, 14 Drawing Figures

3a
4
7
3
1
8
2

ELECTROLYTE CONTAINER FOR BATTERY AND METHOD OF FILLING ELECTROLYTE

FIELD OF THE INVENTION

This invention relates to an electrolyte container for filling electrolyte into a battery comprising plural cells and a method of filling electrolyte.

DESCRIPTION OF THE PRIOR ART

As a means for filling an electrolyte of a prescribed amount into each cell of a dry-charged lead acid battery, a method has conventionally been proposed, wherein a monoblock type electrolyte container filled collectively with an electrolyte of an amount for one battery in one container is attached to a battery for use in filling the battery.

In using such an electrolyte container, however, it is necessary to successively fill electrolyte into each cell through visual measurement because no level defining device is provided. Accordingly, there are the disadvantages that excess in filling some cells and deficiency in filling other cells will occurred. To adjust the electrolyte level in the cells with a syringe, requires manpower and considerable time to transfer the electrolyte from one cell to another. Further, the electrolyte is easily spilled. Moreover, the electrolyte filling speed is faster than the electrolyte absorbing speed to positive and negative plates, glass separators. The electrolyte can overflowed from its filling port.

SUMMARY OF THE INVENTION

In this invention in order to overcome the above disadvantages a container for the electrolyte is provided having a cell unit and filling tube for each battery cell so that each filling tube is aligned with each filling port of the battery. The electrolyte container is fitted with a flow regulator at each port of a predetermined size to regulate the filling speed to the absorbing speed of the plates, glass mat and separators.

FIG. *2a* is an oblique view of a flow regulator.

Figure 3:
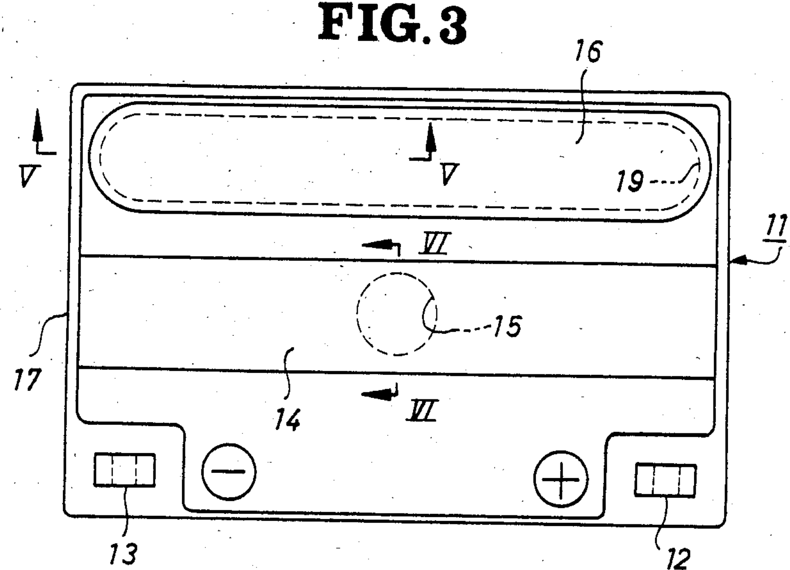

FIG. 3 is a plan view showing an example of a battery.

Figure 4:
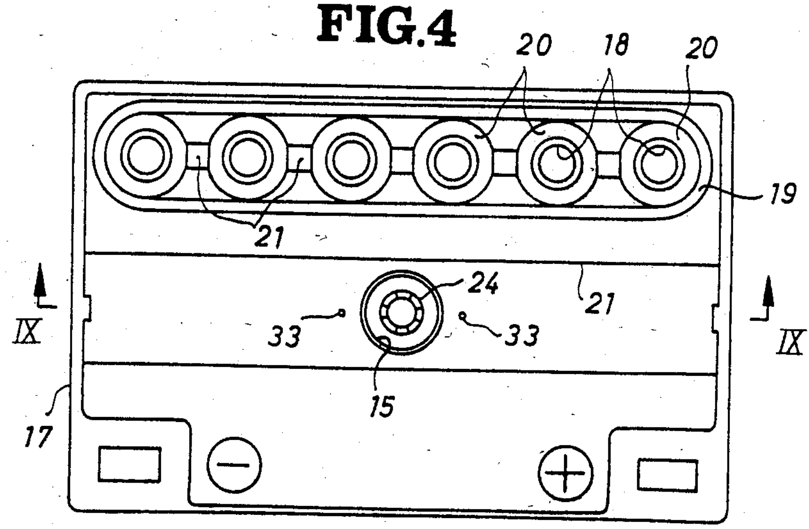

FIG. 4 is a plan view of a cover body.

Figure 5:
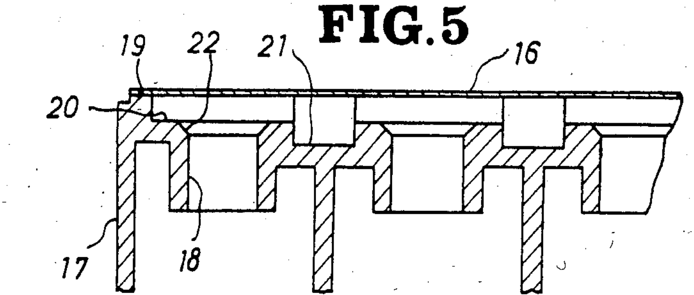
Figure 6:
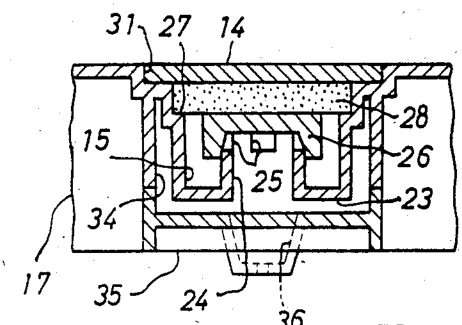

FIG. 5 and FIG. 6 are partial sectional views taken on lines V—V and VI—VI of FIG. 3 respectively.

Figure 7:
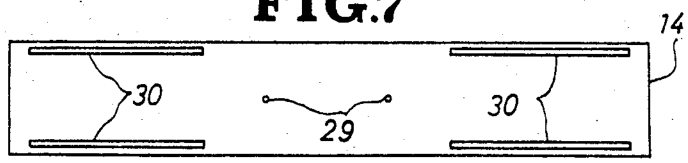

FIG. 7 is a back-side view of a cover plate.

Figure 8:
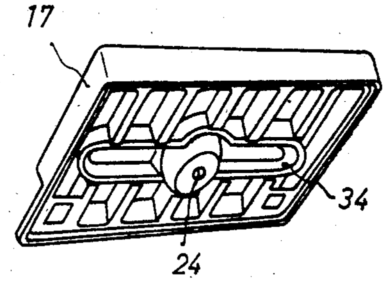

FIG. 8 is a back-side schematic oblique view of the cover body.

Figure 9:
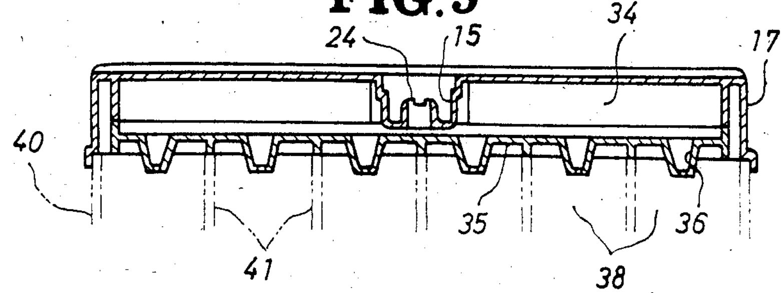

FIG. 9 is a sectional view taken on a line IX—IX of FIG. 4.

Figure 10:
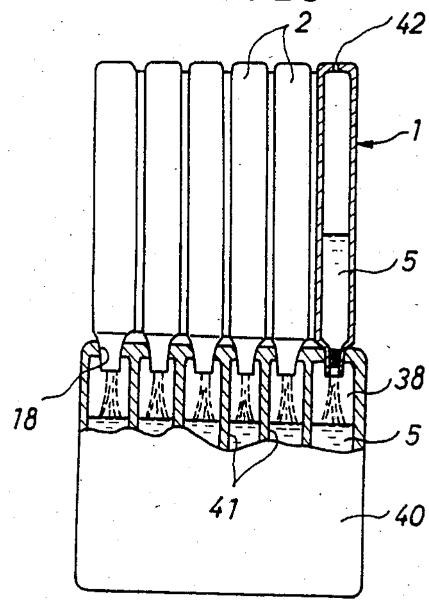

FIG. 10 is a partially sectional schematic elevation view showing a state in the course of filling the electrolyte.

Figure 11:
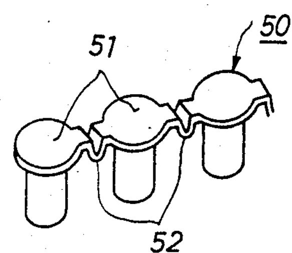

FIG. 11 is a partial oblique view of a sealing plug.

Figure 12:
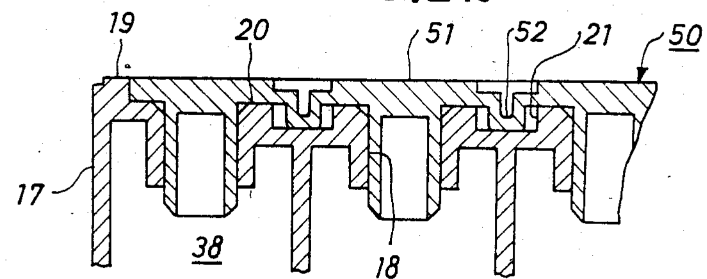

FIG. 12 is a drawing showing a state attached with the sealing plug and corresponding to FIG. 5.

Figure 13:
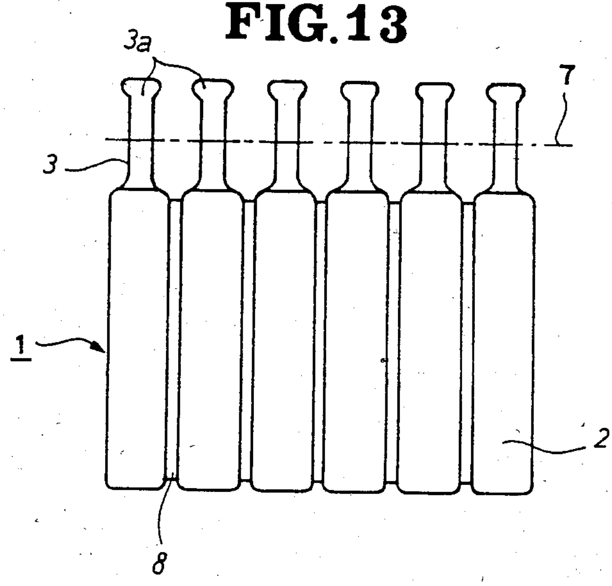

FIG. 13 is a elevation view showing another embodiment.

DETAILED DESCRIPTION OF THE INVENTION

Figure 1:
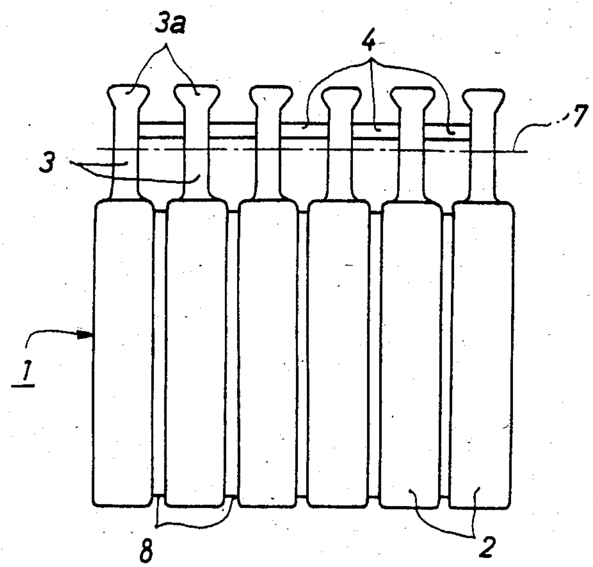
FIG. 1 is an elevation view of the electrolyte container according to this invention.
Figure 2:
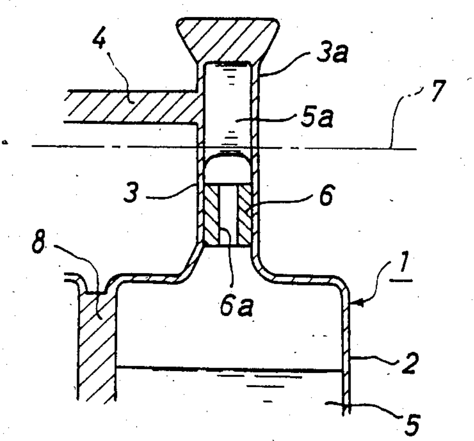
FIG. 2 is a vertical sectional partial view thereof.
Figure 2A:
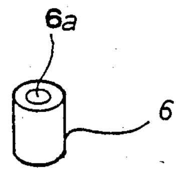

In FIG. 1, a polyolefin resin electrolyte container 1 comprises an approximately parallelopiped six fold shell body 2. The shell bodies 2 are interconnected in one row through means of an integrally formed thin-plate-like connecting part 8. A cylindrical filling tube 3 is integrally formed on a tip end portion (upper end portion of FIG. 1) of each shell body 2. A connecting part 4 extending perpendicularly to the filling tube 3 is integrally provided on a tip end portion of the filling tube 3. The filling tubes 3 are interconnected through means of the connecting part 4. A tip end of the filling tube 3 is thermally fused and sealed. As shown in FIG. 2, the insides of the shell body 2 and the filling tube 3 are hollowed to form a series container for filling closed space. Electrolyte 5 of each of the cell units of a battery (described later) and is sealed in the shell body 2. A cylindrical flow regulator 6 (FIG. *2a*) is pressed into and fixed to a base portion of the filling tube 3. The flow regulator 6 is formed of an acid resistant material. A cutting position 7 is located at a central portion of the filling tube 3 above the regulator 6. The spacing of filling tubes 3 in container 1 coincides with the spacing of filling ports (described later) of the battery so that, when each filling tube 3 is cut at the cutting position 7, the base portion of each filling tube 3 can be inserted into each filling port of the battery.

An example of a battery to which the electrolyte container 1 is applied will be described hereunder. In FIG. 3, battery terminals 12, 13 project upward at two corners of a battery cover 11 and a vent hole 15 covered with a cover plate 14 is provided at a central part. An aluminum foil 16 is secured to an upper surface of the cover 11 in the direction parallel to the plate 14. As shown in FIG. 4 in cover body 17 from which the cover plate 14 and the foil 16 are removed, there are provided vertical filling ports 18 disposed on a straight line in the part covered with the foil 16 (FIG. 3), and a fusion bed 19 fused with the elliptical aluminum foil 16 surrounding the filling port 18 projects slightly upward (this side of paper). Each filling port 18 is disposed at a center of a shouldered part 20 having a diameter larger than the port, and the shouldered parts 20 are laterally interconnected with a connector 21.

As shown in FIG. 5, which is a partial sectional view taken on the line V—V of FIG. 3, an upper end of the filling port 18 is connected through a tapered face 22 to the shouldered part 20 and the recession 21 is formed deeper than the shouldered part 20. An upper end face of the fusion bed 19 surrounding each filling port 18 is situated on the same level and formed higher than its surroundings, and the foil 16 is fused and fixed only to the fusion bed 19. The foil 16 consists of an aluminum foil an bottom face of which is coated with thermoplastic resin and airtightly fused to the fusion bed 19 through means of high frequency heating etc.

As shown in FIG. 6, the vent hole 15 has at its center a cylindrical small dia. portion 24 projecting upward from the bottom plate 23 and a notch 25 evenly disposed in the circumferential direction is provided on an upper end of the small dia. portion 24. A rubber cap 26 fits onto a top of the small diameter portion 24 to elastically close the small diameter portion. A disc-shaped filter 28 comprising such as porous ceramics having gas permeability is fitted in and fixed to a shouldered part 27 formed at a vertically central portion of the port 15, and a bottom face of the filter 28 contacts with the cap 26. When an inner pressure of battery rises, an inner gas push opens a lower part of the rubber cap 26 through the notch 25 of the small dia. portion 24, passes through the filter 28 to be discharged to an outside. Here, a pressure to vent the valve is set, for example, to 0.2-0.4 kg/cm$^2$. The cover plate 14 which covers the port 15 from upper side is a rectangular resin plate as illustrated in FIG. 7, and integrally has at its back-side two central positioning projections 29 and four legs 30 for being fused with the cover. When plate 14 is fixed to a recession 31 formed on an upper surface of the cover body 17 of FIG. 6 by fusing the leg 30 thereto through means of supersonic wave etc, the plate 14 can be easily disposed in place. Incidentally, 33 of FIG. 4 into which the positioning projection 29 fits.

As seen from FIG. 8, an approximately elliptical exhaust passage 34 so provided as to be connected to each cell chamber (described later) passes through a back side of the cover body 17, and a passage forming member 35 shown in FIG. 9 is arranged at a lower part of the exhaust passage 34. The member 35 has an outer peripheral edge including the same shape as the passage 34, and further has an air hole 36 opening to each cell chamber 38 divided by a partition 41 in a container 40 FIG. 10. The construction is formed into a collective exhaust unit in which gas generated in each cell chamber 38 is collectively exhausted from the vent hole 15 through the air hole 36 and the passage 34. Further, an upper end of the container 40 is fused and connected to a lower portion of the cover 17, after a not-shown assembled element (plate, separator etc.) is inserted in each cell chamber 38.

Method of filling electrolyte for the electrolyte container according to this invention will be described hereunder. A battery of FIG. 3 after manufacture and assembly is not filled with the electrolyte. The filling port 18 is airtightly closed by means of the aluminum foil 16 as shown by FIG. 5. The vent hole 15 is elastically closed by closing the small dia. portion 24 with the rubber cap 26. The inside of the battery is kept airtight. Thus positive and negative plates in the battery inside are protected against oxidation.

To commence the use of this battery, it is required to fill the electrolyte in the battery and the electrolyte container 1 of FIG. 1 is used for this purpose. First of all, the aluminum foil 16 of FIG. 3 is removed from the cover 11 to expose the filling port 18. Then, after cutting each filling tube 3 of the container 1 at the cutting position 7, FIGS. 1 and 2, filling tubes 3 are inserted into the filling ports 18 of battery (FIG. 10). Although the electrolyte container 1 is turned upside down in this instance, the electrolyte 5 does not flow down. By making a hole 42 at a bottom part of the shell body 2 with a pin attached to the container (not shown), the electrolyte 5 will be filled in each cell chamber 38 at a prescribed filling speed. The filling speed can be controlled by regulating a diameter of a hole 6a of the flow regulator 6, FIG. 2, which is fitted in and fixed to each filling tube 3. A filling speed of 0.5 to 2.0 cc/sec is preferable because a too high filling speed would cause overflow of the electrolyte from the battery and shortage of battery performance from a prescribed value. For example, a hole diameter of 1.5 mm make it possible to fill the electrolyte of 30 cc in 30 seconds. Further, an amount of electrolyte to be filled is preferably 95-110% of a pore volume of the assembled element (not shown), which is inserted in a container 40. Electrolyte of an amount corresponding thereto has previously been enclosed in each shell body 2 of the container 1.

After completion of filling the electrolyte, the container 1 is removed from the filling port 18, a sealing plug 50 shown in FIG. 11 is fitted in the filling port 18 to hermetically seal the filling port 18 as shown by FIG. 12. The sealing plug 50 consists of plug bodies 51 of a quantity corresponding to a quantity (six, in this case) of the filling port 18, which are integrally connected to each other with connecting parts 52 having flexible curved portions.

While, in case of cutting the filling tube 3 of the container 1 FIGS. 1 and 2, at the cutting position 7, scissors and a nipper etc. are used. In the container 1, the electrolyte 5 is first enclosed in the shell body 2. However, in most cases a part 5a of the electrolyte 5 enters the filling tube 3 due to vibration etc. in the course of transportation and is held in the filling tube 3 as it is by means of surface tension. Consequently, in case of cutting the filling tube 3, it is usual to cut the tube with the part 5a of the electrolyte 5 left in a cut and removable part 3a. Even in such a case, however, each cut and removable part 3a is connected each other by means of the connecting part 4 in the container 1 shown in FIG. 1 and FIG. 2, so that the part 3a will not violently fly about to strike against a workers face or the part 5a of the inside electrolyte 5 will not splash off to give damages to a worker at the time of cutting. Further, its clearance work is also easy because each cut & removable part 3a is connected to each other.

As described above, this invention makes it possible to securely fill a correct amount of the electrolyte with the simple operation, and its industrial value is large.

It is not necessary to dispose of the filling tube 3 at the same intervals on the straight line, but the tube may be properly disposed of after being utilized for filling the electrolyte into the battery. Moreover, it is not necessary to standardize a capacity of the shell body 2. If a required amount of electrolyte differs for each cell, the capacity of the shell body 2 may be varied corresponding to the amount. Naturally, the quantity of the shell body 2 and the filling tube 3 is not limited to six each, but may be changed according to a quantity of the fillng port 18. The flow regulator 6 may be omitted, and in this case the filling speed can be regulated by changing an inner diameter of the filling tube 3.

Furthermore, a construction such as FIG. 13, wherein the connecting part 4 is omitted, may be employed. In this case, however, its mechanism can be simplified but the effect of preventing flying about of the cut and removable part 3a can not be obtained.

What is claimed is:

1. An electrolyte container for use in simultaneously filling electrolyte into the individual cells of a multi-cell dry-charged storage battery, said container comprising a shell body having a plurality of spaced cell units, equal in number to the number of individual cells in the dry-charged storage battery to be filled, each container cell unit enclosing the quantity of electrolyte required to fill the corresponding cell unit of the multi-cell battery to be filled with electrolyte, each of said container shells having a filling tube, said cell units and said filling tubes thereon being spaced on said electrolyte container to coincide with the spacing between said individual cells on said multi-cell battery and the filling ports of said individual battery cells to enable the individual one of said container shell filling tubes to fit into the corresponding one of the filling ports of the corresponding battery cell, each of said container filling tubes includes a flow regulator having a hole of a prescribed size in its inside.

2. An electrolyte container for a battery as set forth in claim 1, in which each said container filling tube includes a part to be cut and removable when said container filling tube is to be inserted into a battery cell port to fill said cell.

3. An electrolyte container for a battery as set forth in claim 2, in which said container cell units are connected in one row through means of an integrally formed thin-plate-like first connecting part, a second connecting part extending perpendicularly to said filling tube adjacent the tip portion of said filling tubes to connect said filling tubes, said tip end of said filling tubes being thermally fused and sealed, and a cylindrical flow regulator consisting of acid resisting material fixed in each of said filling tubes between said part to be cut and removed and the electrolyte in said container cells.

* * * * *